United States Patent
Jiang et al.

(10) Patent No.: US 10,022,707 B2
(45) Date of Patent: Jul. 17, 2018

(54) SULFUR-TOLERANT CO SHIFT CONVERSION CATALYST AND PREPARATION METHOD THEREOF

(71) Applicant: FUZHOU UNIVERSITY, Fujian (CN)

(72) Inventors: Lilong Jiang, Fujian (CN); Yanning Cao, Fujian (CN); Kemei Wei, Fujian (CN); Yongde Ma, Fujian (CN)

(73) Assignee: FUZHOU UNIVERSITY, Fujian (CN)

( * ) Notice: Subject to any disclaimer, the term of this patent is extended or adjusted under 35 U.S.C. 154(b) by 0 days.

(21) Appl. No.: 15/309,118

(22) PCT Filed: Jan. 13, 2015

(86) PCT No.: PCT/CN2015/070590
§ 371 (c)(1),
(2) Date: Nov. 4, 2016

(87) PCT Pub. No.: WO2016/112489
PCT Pub. Date: Jul. 21, 2016

(65) Prior Publication Data
US 2017/0120226 A1    May 4, 2017

(51) Int. Cl.
| | | |
|---|---|---|
| *B01J 23/887* | (2006.01) | |
| *C10K 3/04* | (2006.01) | |
| *B01J 37/08* | (2006.01) | |
| *B01J 37/02* | (2006.01) | |
| *B01J 23/88* | (2006.01) | |
| *B01J 37/00* | (2006.01) | |

(52) U.S. Cl.
CPC ........... *B01J 23/8872* (2013.01); *B01J 23/88* (2013.01); *B01J 23/8875* (2013.01); *B01J 37/0009* (2013.01); *B01J 37/0207* (2013.01); *B01J 37/08* (2013.01); *C10K 3/04* (2013.01)

(58) Field of Classification Search
CPC .................................................. B01J 23/8872
See application file for complete search history.

(56) References Cited

U.S. PATENT DOCUMENTS

2010/0000155 A1    1/2010 Schiodt

FOREIGN PATENT DOCUMENTS

| CN | 1205114 | 9/2004 |
|---|---|---|
| CN | 101214442 | 7/2008 |
| CN | 102049262 | 5/2011 |
| CN | 102240556 | 11/2011 |
| CN | 103143398 | 6/2013 |
| CN | 103182311 | 7/2013 |
| WO | WO2008153826 | 12/2008 |

OTHER PUBLICATIONS

PCT Search Report dated Jul. 21, 2016 for corresponding PCT International Application No. PCT/CN2015/070590, 6 pages.

*Primary Examiner* — Douglas B Call
(74) *Attorney, Agent, or Firm* — Lee & Hayes, PLLC

(57) ABSTRACT

The present invention discloses a sulfur tolerant carbon monoxide shift conversion catalyst, prepared by the following materials: magnesium source, aluminum source, oxide flux, crystal growth agent, rare earth additive, CoO, $MoO_3$ and an acidic aqueous solution. A preparation method of the catalyst is provided, comprising the steps of: S1, Adding an aqueous acidic solution and a specific amount of rare earth additive to a specific amount of magnesium source, aluminum source, oxide flux and crystal growth agent, followed by kneading to produce a mixture; S2, Extruding the mixture to obtain an extruded strip product; S3, Drying the extruded strip product to give a semi-finished product; S4, Calcining the semi-finished product to obtain a catalyst carrier; S5, Impregnating the catalyst carrier with the active components CoO and $MoO_3$ by an incipient-wetness impregnation method to obtain an impregnated product; and S6, Calcining the impregnated product to obtain the catalyst. The oxide flux and crystal growth agent can participate in a solid phase reaction between the magnesium source and aluminum source to form spinel structure, thereby improving the mechanical strength and stability of the spinel. The nano-sized active component can effectively improve the dispersion of the active component, and improve the catalytic activity of the granular boundary of the active component.

18 Claims, 1 Drawing Sheet

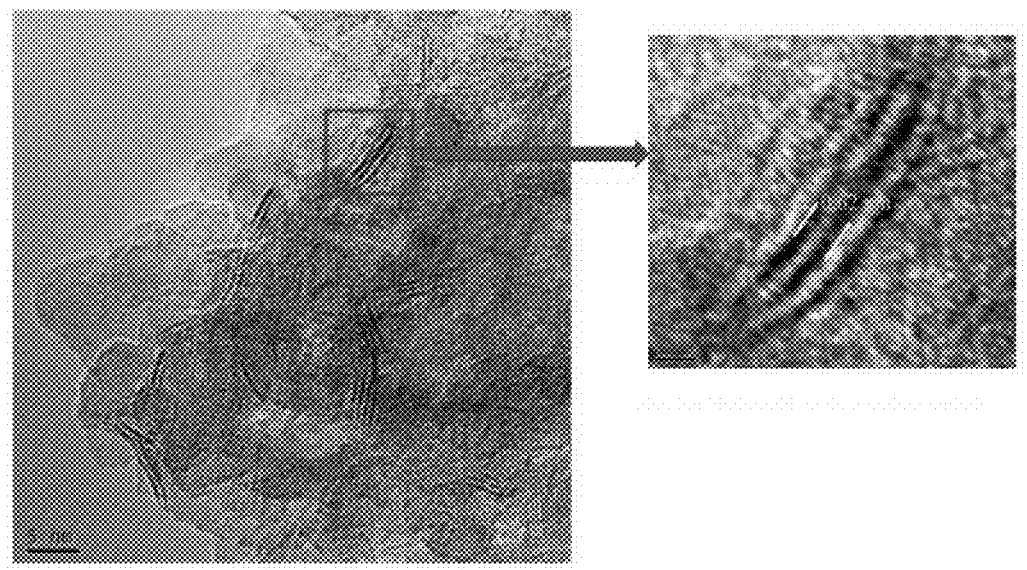

SULFUR-TOLERANT CO SHIFT CONVERSION CATALYST AND PREPARATION METHOD THEREOF

FIELD OF THE INVENTION

The present invention relates to a sulfur tolerant carbon monoxide shift conversion catalyst and preparation thereof, and the catalyst suitable for shift conversion of carbon monoxide of high concentration to produce hydrogen, belonging to the coal chemical industry.

DESCRIPTION OF THE RELATED ART

When coal or residual oil is used as raw material in the production process of synthetic ammonia or industrial methanol, carbon monoxide (CO) shift conversion is an important step which can increase $H_2$ content in a feed gas to meet the requirement for $H_2$ content in the synthesis reaction, while can reduce CO content, thereby avoiding catalyst poisoning due to a high concentration of CO in the subsequent process. CO shift conversion refers to a process wherein CO is reacted with steam to form $CO_2$ and $H_2$ in the presence of a catalyst. Carbon monoxide shift conversion catalyst commonly used in the industry mainly includes Fe—Cr-based catalyst, Cu—Zn—Al-based catalyst, precious metals-based catalyst and Co—Mo-based catalyst.

So far, with the rapid development of coal gasification technology, gases produced from coal-water slurry pressured gasification and pressurized pulverized coal gasification have the features including high pressure, high $H_2S$ concentration, high CO concentration and high proportion of water vapor, and contain a certain amount of tar and organic sulfur. To achieve an efficient shift conversion of carbon monoxide contained in this complex gas mixture to produce hydrogen, the key is to select an efficient sulfur tolerant carbon monoxide shift conversion catalyst. Since the carbon monoxide shift reaction is a highly exothermic catalytic reaction, the reaction temperature often reaches more than 600° C. so as to achieve a efficient shift conversion of carbon monoxide with high concentration to hydrogen, thereby the catalyst is generally susceptible to sintering and became inactivated. Therefore, among many shift catalyst systems, Co—Mo-based catalyst with magnesia-alumina spinel ($MgAl_2O_4$) as a carrier is suitable for shift conversion of CO and $H_2S$ with high concentration contained in this complex mixed gas to produce hydrogen, due to its wide temperature range of use, good activity of catalyst-shift, high sulfur resistance property and no sulfur poisoning.

Co—Mo-based sulfur-tolerant catalysts with $MgAl_2O_4$ as a carrier is primarily composed of oxides and complex oxides of Mg, Al, Co, Mo and so on, wherein oxides of Mg and Al are used as carrier materials, which is generally prepared by co-precipitation or kneading in the prior art. For example: China Patent Document CN1205114C discloses a method for preparing a potassium free carbon monoxide shift catalyst, comprising: (1) weighing light magnesium oxide and porous amorphous hydrous alumina, placing in a kneading machine, adding an acid aqueous solution, mixing and kneading to form a plastic body; (2) placing the plastic body on a plastic extrusion machine for extruding, to form a strip; (3) drying the strip at a temperature of 80-150° C. for a period of 4-6 h; (4) calcining the the dried strip at a temperature of 700-900° C. for a period of 2-4 h to obtain the carbon monoxide shift catalyst. In the above techniques, the formed magnesia-alumina spinel phase has a high degree of crystallinity, however, since the process for preparing the catalyst has a calcination temperature as high as 700-900° C., the catalyst is susceptible to severe high-temperature sintering, thereby the carbon monoxide shift catalyst has a low specific surface area, the volume of the active phase of the catalyst after sintering will be increased to micron level, and thus affecting the utilization of the active component of the catalyst, ultimately reducing the catalytic activity.

To solve the technical problems that the catalyst carrier in the above techniques has a lower specific surface area, Chinese patent application document CN103182311A discloses a method for preparing a sulfur-tolerant carbon monoxide carrier, wherein the carrier is prepared by the following steps: (1) dissolving magnesium and aluminum salts and rare earth oxide with an acid to obtain a homogeneous solution; (2) adding a precipitating agent to the homogeneous solution in step (1) to make it uniformly gelated, washing with water, filter-pressing to form a gel; (3) preparing magnesium and aluminum salt powders and mixing with the gel uniformly, and then forming, drying and calcinating to obtain the rare earth modified magnesium-aluminum spinel carrier. The magnesium-aluminum spinel carrier prepared by the method has a high specific surface area, but it is also susceptible to the phenomenon of high-temperature sintering because the calcinating temperature is as high as 450-900□. The magnesium-aluminum spinel carrier obtained by the method has a lower degree of crystallinity, lower mechanical strength, poor anti-hydratability, and the preparation process is complex and will produce large amounts of waste water during the preparing process.

SUMMARY OF THE INVENTION

In order to solve the problems that sulfur tolerant CO shift conversion catalyst is easily subjected to sintering and has low crystallinity, low mechanical strength, poor anti-hydratability, and the preparation method thereof is complicated, the present invention provides a sulfur tolerant carbon monoxide shift conversion catalyst with a high activity and high crystallinity which can be prepared by a simple process.

In one aspect, the present invention provides a sulfur tolerant carbon monoxide shift conversion catalyst, at least prepared by the following materials:

a magnesium source, 8.9-18.5 parts by weight;

an aluminum source, the molar ratio of the magnesium source to the aluminum source is 0.92-1.36, wherein the magnesium source is calculated in the form of MgO and the aluminum source is calculated in the form of $Al_2O_3$;

an oxide flux, 1.5-3.0 parts by weight;

a crystal growth agent, 1.5-3.6 parts by weight;

a rare earth additive, 0.9-3.0 parts by weight;

CoO, 0.2-1.5 parts by weight;

$MoO_3$, 1.4-3.2 parts by weight; and an acidic aqueous solution, 37.8-63.3 parts by weight.

Preferably, the crystal growth agent is a magnesia-alumina spinel powder having a particle size of 150-200 mesh and a specific surface area of 20-40 $m^2/g$.

Preferably, the oxide flux is one or a mixture of two selected from the group consisting of CaO, $K_2O$, PbO and $B_2O_3$, and has a particle size of 150-200 mesh.

Preferably, the rare earth additive is selected from the group consisting of $La_2O_3$, $Pr_2O_3$, $CeO_2$ and mixtures thereof.

Preferably, the aluminum source is selected from the group consisting of pseudo-boehmite powder, $Al_2O_3$, $Al_2O_3 \cdot H_2O$, $Al_2O_3 \cdot 3H_2O$, aluminium nitrate and mixtures thereof.

Preferably, the magnesium source is selected from the group consisting of basic magnesium carbonate, $Mg(OH)_2$, light MgO and mixtures thereof.

Preferably, The acidic aqueous solution is selected from the group consisting of nitric acid, oxalic acid, citric acid or acetic acid or mixtures thereof, having a concentration of 0.5~6 mol/L.

Preferably, the CoO and $MoO_3$ constitutes an active component of the catalyst, and a main phase of the active component is $MoS_2$ having a sheet structure with a size of 5 nm.

In another aspect, the present invention provides a preparation method of the sulfur tolerant carbon monoxide shift catalyst, the method comprising:

S1, Adding an acidic aqueous solution and a specific amount of a rare earth additive to a specific amount of a magnesium source, a aluminum source, an oxide flux and a crystal growth agent, followed by kneading to produce a mixture;

S2, Extruding the mixture to obtain an extruded product;

S3, Drying the extruded product at a temperature of 120-140° C. for a period of 5-8 hours to give a semi-finished product;

S4, Calcining the semi-finished product at a temperature of 550-650° C. for a period of 6-13 hours to obtain a catalyst carrier;

S5, Impregnating the catalyst carrier with active components CoO and $MoO_3$ by an incipient-wetness impregnation method to obtain an impregnated product; and S6, Calcining the impregnated product at a temperature of 300-450° C. for a period of 2-8 h to obtain the sulfur tolerant carbon monoxide shift conversion catalyst.

The sulfur tolerant carbon monoxide shift catalyst of the present invention has the following advantages over the prior art:

(1) The sulfur tolerant carbon monoxide shift catalyst of the present invention comprises a magnesium source, an aluminum source, an oxide flux, a crystal growth agent, an rare earth additive, CoO, $MoO_3$ and an acidic aqueous solution. The specific amount of the magnesium source, aluminum source, oxide flux, crystal growth agent, rare earth additive and acidic aqueous solution form a magnesium-alumina spinel ($MgAl_2O_4$) catalyst carrier which contains rare earth elements and has a compact structure, good crystallinity and excellent anti-hydratability. The crystal growth agent can accelerate the formation of the magnesium-alumina spinel, and greatly increase the crystallinity of the magnesium-alumina spinel, such that the magnesium-alumina spinel catalyst carrier has a greatly improved mechanical strength over that of the catalyst of the prior art and has a good stability. Preferably, CoO and $MoO_3$ constitute the active component of the catalyst, such that the catalyst has a high catalytic activity and is hard to be poisoned by sulfur. Meanwhile, the rare earth elements contained in the rare earth additive have a larger ionic radius than that of Mg and Al ions, which can effectively inhibit the sintering after formation of $MgAl_2O_4$ by Mg and Al, and thus effectively improving and maintaining the specific surface area of the carrier. The rare earth elements have a larger ionic radius than that of Co and Mo, which can effectively inhibit the catalytic active components Co and Mo from being sintered.

(2) The sulfur tolerant carbon monoxide shift conversion catalyst of the present invention comprises CoO and $MoO_3$ as active components, and the main phase of the active components is $MoS_2$ having a sheet structure with a size of about 5 nm. The nano-sized active component effectively improve the dispersion of the active component, improve the catalytic activity of the granular boundary of the active component, so that the catalytic activity has been significantly improved even when the active component is in a low content.

(3) The preparation method of the sulfur-tolerant carbon monoxide shift conversion catalyst of the present invention comprises: S1, adding an acidic aqueous solution and a specific amount of rare earth additive to the specific amount of magnesium source, aluminum source, oxide flux and crystal growth agent, followed by kneading to produce a mixture; S2, extruding the mixture to obtain an extruded product; S3, drying the extruded product to give a semi-finished product; S4, calcining the semi-finished product to obtain a catalyst carrier; S5, impregnating the catalyst carrier with the active components CoO and $MoO_3$ by an incipient-wetness impregnation method to obtain an impregnated product; S6, calcining the impregnated product to give the sulfur tolerant carbon monoxide shift conversion catalyst. By the preparation method of the present invention, the oxide flux and crystal growth agent added in the step S1 can participate in a solid phase reaction between the magnesium source and aluminum source to form spinel structure, and can damage the high lattice energy of a precursor for the magnesium-aluminum spinel, thus promote the migration rate of $Mg^{2+}$ and $Al^{3+}$ contained in the precursor for magnesium-aluminum spinel, accelerate the solid phase reaction, and effectively reduce the formation temperature for the magnesium-aluminum spinel, therefore can save energy. Meanwhile, adding the perfectly crystallized magnesium-aluminum spinel to the reaction system for serving as a crystal growth agent can induce to accelerate the solid-phase reaction, and greatly improve the crystallinity of the spinel by reducing the forming temperature and accelerating the phase reaction, thereby improving the mechanical strength and stability of the magnesium-aluminum spinel. The preparation method of the present invention is simple and easy to operate.

BRIEF DESCRIPTION OF THE DRAWINGS

In order to make the content of the present invention are more likely to be clearly understood, the content of the present invention will now be described in detail with reference to FIGURES and detailed embodiments.

FIG. 1 shows a transmission electron microscopy (TEM) image of sulfur-tolerant carbon monoxide shift conversion catalyst in Example 1.

DETAILED EMBODIMENTS OF THIS INVENTION

Example 1

The Example 1 provides a sulfur tolerant carbon monoxide shift conversion catalyst, which is prepared by the following materials:

basic magnesium carbonate, 18.5 parts by weight;

$Al_2O_3$, wherein a molar ratio of the basic magnesium carbonate to $Al_2O_3$ is 0.92, and wherein the amount of the basic magnesium carbonate is calculated in the form of MgO;

PbO, 3.0 parts by weight, with a particle size of 200 mesh in the Example 1;

magnesia-alumina spinel powder, 1.5 parts by weight, with a particle size of 200 mesh and a specific surface area of 20 $m^2/g$ in the Example 1;

$CeO_2$, 1.5 parts by weight;
CoO, 0.6 parts by weight;
$MoO_3$, 1.4 parts by weight;
1 mol/L of nitric acid solution, 56.0 parts by weight.

A preparation method of the sulfur tolerant carbon monoxide shift conversion catalyst comprises:

S1, Weighting basic magnesium carbonate and $Al_2O_3$ proportionally, and mixing them with 3.0 parts by weight of PbO, 1.5 parts by weight of magnesia-alumina spinel powder and 1.5 parts by weight of $CeO_2$, then adding 56.0 parts by weight of nitric acid solution of 1 mol/L, followed by kneading to produce a mixture;

S2, Extruding the mixture to obtain an extruded strip product;

S3, Drying the extruded strip product at a temperature of 120° C. for a period of 5 hours to give a semi-finished product;

S4, Calcining the semi-finished product at a temperature of 550° C. for a period of 6 hours to obtain a catalyst carrier labeled as T1;

S5, Impregnating the catalyst carrier T1 with 0.6 parts by weight of CoO and 1.4 parts by weight of $MoO_3$ by an incipient-wetness impregnation method to obtain an impregnated product; and S6, Calcining the impregnated product at a temperature of 300° C. for a period of 2 h to obtain the sulfur tolerant CO shift conversion catalyst labeled as F1.

Example 2

The Example 2 provides a sulfur tolerant CO shift conversion catalyst, which is prepared by the following materials:

light MgO, 8.9 parts by weight;
$Al_2O_3.H_2O$, wherein a molar ratio of MgO to $Al_2O_3$ is 1.36; CaO, 2.3 parts by weight, with a particle size of 150 mesh in the Example 2;
magnesia-alumina spinel powder, 3.6 parts by weight, with a particle size of 150 mesh and a specific surface area of 40 $m^2/g$ in the Example 2;
$Pr_2O_3$, 0.9 parts by weight;
CoO, 0.2 parts by weight;
$MoO_3$, 3.2 parts by weight; and
acetic acid solution of 2 mol/L, 44.6 parts by weight.

A preparation method of the sulfur tolerant carbon monoxide shift conversion catalyst comprises:

S1, weighting the light MgO and $Al_2O_3.H_2O$ proportionally, and mixing them with 2.3 parts by weight of CaO, 3.6 parts by weight of magnesia-alumina spinel powder and 0.9 parts by weight of $Pr_2O_3$, then adding 44.6 parts by weight of acetic acid solution of 2 mol/L, followed by kneading to produce a mixture;

S2, Extruding the mixture to obtain an extruded strip product;

S3, Drying the extruded strip product at a temperature of 140° C. for a period of 8 hours to give a semi-finished product;

S4, Calcining the semi-finished product at a temperature of 550° C. for a period of 13 hours to obtain a catalyst carrier T2;

S5, Impregnating the catalyst carrier T2 with 0.2 parts by weight of CoO and 3.2 parts by weight of $MoO_3$ by an incipient-wetness impregnation method to obtain an impregnated product; and S6, Calcining the impregnated product at a temperature of 450° C. for a period of 2 h to obtain the sulfur tolerant CO shift conversion catalyst F2.

Example 3

The Example 3 provides a sulfur tolerant CO shift conversion catalyst, which is prepared by the following materials:

light MgO, 8.9 parts by weight;
$Al_2O_3.3H_2O$, wherein a molar ratio of MgO to $Al_2O_3$ is 1.36;
$B_2O_3$, 1.5 parts by weight, with a particle size of 200 mesh in the Example 3;
magnesia-alumina spinel powder, 3.6 parts by weight, with a particle size of 200 mesh and a specific surface area of 30 $m^2/g$ in the Example 3;
$Pr_2O_3$, 0.9 parts by weight;
CoO, 0.2 parts by weight;
$MoO_3$, 3.2 parts by weight; and
acetic acid solution of 2 mol/L, 44.6 parts by weight.

The sulfur tolerant carbon monoxide shift conversion catalyst is prepared by a method comprising:

S1, weighting the light MgO and $Al_2O_3.3H_2O$ proportionally, and mixing them with 1.5 parts by weight of $B_2O_3$, 3.6 parts by weight of magnesia-alumina spinel powder and 0.9 parts by weight of $Pr_2O_3$, then adding 44.6 parts by weight of acetic acid solution of 2 mol/L, followed by kneading to produce a mixture;

S2, Extruding the mixture to obtain an extruded strip product;

S3, Drying the extruded strip product at a temperature of 120° C. for a period of 8 hours to give a semi-finished product;

S4, Calcining the semi-finished product at a temperature of 650° C. for a period of 13 hours to obtain a catalyst carrier T3;

S5, Impregnating the catalyst carrier T3 with 0.2 parts by weight of CoO and 3.2 parts by weight of $MoO_3$ by an incipient-wetness impregnation method to obtain an impregnated product; and S6, Calcining the impregnated product at a temperature of 450° C. for a period of 8 h to obtain the sulfur tolerant CO shift conversion catalyst F3.

Example 4

The Example 4 provides a sulfur tolerant CO shift conversion catalyst, which is prepared by the following materials:

$Mg(OH)_2$, 10.0 parts by weight;
aluminum pseudoboehmite powder, when calculated in the form of $MgO/Al_2O_3$, a molar ratio of $Mg(OH)_2$ to the aluminum pseudoboehmite powder is 1.05;
$K_2O$, 1.5 parts by weight, with a particle size of 200 mesh in the Example 4;
magnesia-alumina spinel powder, 3.2 parts by weight, with a particle size of 200 mesh and a specific surface area of 35 $m^2/g$ in the Example 4;
$CeO_2$, 3.0 parts by weight;
CoO, 1.5 parts by weight;
$MoO_3$, 1.8 parts by weight; and
citric acid solution of 6 mol/L, 37.8 parts by weight.

The sulfur tolerant CO shift conversion catalyst is prepared by a method comprising the steps of:

S1, weighting the $Mg(OH)_2$ and aluminum pseudoboehmite powder proportionally, and mixing them with 1.5 parts by weight of $K_2O$, 3.2 parts by weight of magnesia-alumina spinel powder, and 3.0 parts by weight of $CeO_2$, then adding 37.8 parts by weight of citric acid solution of 6 mol/L, followed by kneading to produce a mixture;

S2, Extruding the mixture to obtain an extruded strip product;

S3, Drying the extruded strip product at a temperature of 140° C. for a period of 5 hours to give a semi-finished product;

S4, Calcining the semi-finished product at a temperature of 650° C. for a period of 6 hours to obtain a catalyst carrier T4;

S5, Impregnating the catalyst carrier T4 with 1.5 parts by weight of CoO and 1.8 parts by weight of $MoO_3$ by an incipient-wetness impregnation method to obtain an impregnated product; and S6, Calcining the impregnated product at a temperature of 300° C. for a period of 8 h to obtain the sulfur tolerant CO shift conversion catalyst F4.

Example 5

The Example 5 provides a sulfur tolerant CO shift conversion catalyst, which is prepared by the following materials:
  basic magnesium carbonate, 12.2 parts by weight;
  aluminium nitrate, when calculated in the form of $MgO/Al_2O_3$, a molar ratio of the basic magnesium carbonate to the aluminium nitrate is 1.10;
  PbO, 0.9 parts by weight,
  CaO, 0.9 parts by weight;
  magnesia-alumina spinel powder, 1.8 parts by weight;
  $Pr_2O_3$, 1.2 parts by weight;
  CoO, 0.5 parts by weight;
  $MoO_3$, 1.9 parts by weight;
  nitric acid solution of 0.5 mol/L, 30 parts by weight, and oxalic acid solution of 0.5 mol/L, 33.3 parts by weight.

The sulfur tolerant carbon monoxide shift conversion catalyst is prepared by a method comprising the steps of:

S1, Weighting the basic magnesium carbonate and aluminium nitrate proportionally, and mixing them with 0.9 parts by weight of PbO, 0.9 parts by weight of CaO, 1.8 parts by weight of magnesia-alumina spinel powder, and 1.2 parts by weight of $Pr_2O_3$, then adding 30 parts by weight of nitric acid solution of 0.5 mol/L and 33.3 parts by weight of oxalic acid solution of 0.5 mol/L, followed by kneading to produce a mixture;

S2, Extruding the mixture to obtain an extruded strip product;

S3, Drying the extruded strip product at a temperature of 130° C. for a period of 6 hours to give a semi-finished product;

S4, Calcining the semi-finished product at a temperature of 600° C. for a period of 9 hours to obtain a catalyst carrier T5;

S5, Impregnating the catalyst carrier T5 with 0.5 parts by weight of CoO and 1.9 parts by weight of $MoO_3$ by an incipient-wetness impregnation method to obtain an impregnated product; and S6, Calcining the impregnated product at a temperature of 400° C. for a period of 5 h to obtain the sulfur tolerant CO shift conversion catalyst F5.

Example 6

The Example 6 provides a sulfur tolerant carbon monoxide shift conversion catalyst which is prepared by the following materials:
  light MgO, 5.9 parts by weight, $Mg(OH)_2$, 3 parts by weight;
  $Al_2O_3.H_2O$, when calculated in the form of $MgO/Al_2O_3$, a molar ratio of the light MgO and $Mg(OH)_2$ to the $Al_2O_3.H_2O$ is 1.36;
  $B_2O_3$, 1.8 parts by weight,
  $K_2O$, 0.5 parts by weight;
  magnesia-alumina spinel powder, 2.3 parts by weight;
  $CeO_2$, 1.3 parts by weight,
  $La_2O_3$, 1.0 parts by weight;
  CoO, 0.9 parts by weight;
  $MoO_3$, 2.2 parts by weight; and
  citric acid solution of 3 mol/L, 44.7 parts by weight.

The sulfur tolerant carbon monoxide shift conversion catalyst is prepared by a method comprising the steps of:

S1, Weighting the light MgO, $Mg(OH)_2$ and $Al_2O_3.H_2O$ proportionally, and mixing them with 1.8 parts by weight of $B_2O_3$, 0.5 parts by weight of $K_2O$, 2.3 parts by weight of magnesia-alumina spinel powder, 1.3 parts by weight of $CeO_2$, and 1.0 parts by weight of $La_2O_3$, then adding 44.7 parts by weight of citric acid solution of 3 mol/L, followed by kneading to produce a mixture;

S2, Extruding the mixture to obtain an extruded strip product;

S3, Drying the extruded strip product at a temperature of 140° C. for a period of 6 hours to give a semi-finished product;

S4, Calcining the semi-finished product at a temperature of 550° C. for a period of 13 hours to obtain a catalyst carrier T6;

S5, Impregnating the catalyst carrier T6 with 0.9 parts by weight of CoO and 2.2 parts by weight of $MoO_3$ by an incipient-wetness impregnation method to obtain an impregnated product; and S6, Calcining the impregnated product at a temperature of 450° C. for a period of 5 h to obtain the sulfur tolerant carbon monoxide shift catalyst F6.

Example 7

The Example 7 provides a sulfur tolerant carbon monoxide shift conversion catalyst, prepared by the following materials:
  light MgO, 8.9 parts by weight;
  $Al_2O_3.H_2O$ and $Al_2O_3.3H_2O$, when calculated in the form of $MgO/Al_2O_3$, a molar ratio of the light MgO to $Al_2O_3.H_2O$ and $Al_2O_3.3H_2O$ is 1.25;
  PbO, 1.8 parts by weight,
  $K_2O$, 0.5 parts by weight;
  magnesia-alumina spinel powder, 2.3 parts by weight;
  $CeO_2$, 0.8 parts by weight,
  $La_2O_3$, 1.5 parts by weight;
  CoO, 0.9 parts by weight;
  $MoO_3$, 2.2 parts by weight; and
  oxalic acid solution of 3 mol/L, 63.3 parts by weight.

The sulfur tolerant carbon monoxide shift conversion catalyst is prepared by a method comprising the steps of:

S1, Weighting the light MgO, $Al_2O_3.H_2O$ and $Al_2O_3.3H_2O$ proportionally, and mixing them with 1.8 parts by weight of PbO, 0.5 parts by weight of $K_2O$, 2.3 parts by weight of magnesia-alumina spinel powder, 0.8 parts by weight of $CeO_2$, 1.5 parts by weight of $La_2O_3$, then adding 63.3 parts by weight of oxalic acid solution of 3 mol/L, followed by kneading to produce a mixture;

S2, Extruding the mixture to obtain an extruded strip product;

S3, Drying the extruded strip product at a temperature of 130° C. for a period of 7 hours to give a semi-finished product;

S4, Calcining the semi-finished product at a temperature of 620° C. for a period of 8 hours to obtain a catalyst carrier T7;

S5, Impregnating the catalyst carrier T7 with 0.9 parts by weight of CoO and 2.2 parts by weight of $MoO_3$ by an incipient-wetness impregnation method to obtain an impregnated product; and S6, Calcining the impregnated product at a temperature of 420° C. for a period of 6 h to obtain the sulfur tolerant carbon monoxide shift catalyst F7.

Comparative Example 1

The Comparative Example 1 provides a sulfur tolerant carbon monoxide shift conversion catalyst, prepared by the following materials:

basic magnesium carbonate, 18.5 parts by weight;
$Al_2O_3$, when calculated in the form of $MgO/Al_2O_3$, a molar ratio of the basic magnesium carbonate to $Al_2O_3$ is 0.92;
CoO, 0.6 parts by weight;
$MoO_3$, 1.4 parts by weight; and
nitric acid solution of 1 mol/L, 56 parts by weight.

A process for preparing the sulfur tolerant carbon monoxide shift catalyst comprises the steps of:

S1, Weighting the basic magnesium carbonate and $Al_2O_3$ proportionally, and then adding 56 parts by weight of nitric acid solution of 1 mol/L, followed by kneading to produce a mixture;

S2, Extruding the mixture to obtain an extruded strip product;

S3, Drying the extruded strip product at a temperature of 120° C. for a period of 5 hours to give a semi-finished product;

S4, Calcining the semi-finished product at a temperature of 550° C. for a period of 6 hours to obtain a catalyst carrier T8;

S5, Impregnating the catalyst carrier T8 with 0.6 parts by weight of CoO and 1.4 parts by weight of $MoO_3$ by an incipient-wetness impregnation method to obtain an impregnated product; and;

S6, Calcining the impregnated product at a temperature of 300° C. for a period of 2 h to obtain the sulfur tolerant carbon monoxide shift catalyst F8.

Comparative Example 2

The Comparative Example 2 provides a sulfur tolerant carbon monoxide shift catalyst, prepared by the following materials:

basic magnesium carbonate, 18.5 parts by weight;
$Al_2O_3$, when calculated in the form of $MgO/Al_2O_3$, a molar ratio of the basic magnesium carbonate to $Al_2O_3$ is 0.92;
PbO, 3.0 parts by weight, with a particle size of 200 mesh;
$CeO_2$, 1.5 parts by weight;
CoO, 0.6 parts by weight;
$MoO_3$, 1.4 parts by weight; and
nitric acid solution of 1 mol/L, 56 parts by weight.

A process for preparing the sulfur tolerant carbon monoxide shift catalyst, comprising the steps of:

S1, Weighting the basic magnesium carbonate and $Al_2O_3$ proportionally, and mixing them with 3.0 parts by weight of PbO, 1.5 parts by weight of $CeO_2$, then adding 56 parts by weight of nitric acid solution of 1 mol/L, followed by kneading to produce a mixture;

S2, Extruding the mixture to obtain an extruded strip product;

S3, Drying the extruded strip product at a temperature of 120° C. for a period of 5 hours to give a semi-finished product;

S4, Calcining the semi-finished product at a temperature of 550° C. for a period of 6 hours to obtain a catalyst carrier T9;

S5, Impregnating the catalyst carrier T9 with 0.6 parts by weight of CoO and 1.4 parts by weight of $MoO_3$ by an incipient-wetness impregnation method to obtain an impregnated product; and;

S6, Calcining the impregnated product at a temperature of 300° C. for a period of 2 h to obtain the sulfur tolerant carbon monoxide shift catalyst F9.

Test Examples

In order to demonstrate the technical effects of the sulfur-tolerant carbon monoxide shift conversion catalyst of the present invention, the following test examples are designed to measure the properties of the sulfur-tolerant carbon monoxide shift conversion catalyst of the above Examples 1-7 and Comparative Examples 1-2:

1. The Sulfur-Tolerant Carbon Monoxide Shift Catalysts Provided in the Examples 1-7 and Comparative Examples 1-2 are Tested for Measuring their Strength, Pore Volume, Average Pore Diameter and Specific Surface Area.

Strength measurement is carried out in accordance with the standard of "HG 2782-1996-T, measurement of anti-crushing force of fertilizer catalyst particle". The measurement of pore volume, average pore diameter and specific surface area is carried out with a gas adsorption pore diameter measuring instrument (Ominisorp 100cx type, Micrometrics company, US). Weighing 0.10 g of dried samples, vacuumizing at a temperature of 200° C. for a period of 2 h till the pressure is less than $10^{-5}$ Torr, measuring a adsorption-desorption curve with $N_2$ as adsorbate, at a liquid nitrogen temperature of −196° C. The specific surface area is calculated out according to the adsorption branch of the adsorption-desorption curve by using BET method. The pore volume and pore distribution are calculated out according to the desorption branch of the adsorption-desorption curve by using BJH method. The results shown in Table 1:

TABLE 1

| | Structure parameters | | | |
| --- | --- | --- | --- | --- |
| | Strength $N \cdot cm^{-1}$ | Pore volume $(ml \cdot g^{-1})$ | Average pore diameter (nm) | specific surface area $(m^2 \cdot g^{-1})$ |
| Carrier T1 | 203 | 0.49 | 5.8 | 168 |
| Carrier T2 | 223 | 0.45 | 6.2 | 156 |
| Carrier T3 | 193 | 0.49 | 5.5 | 173 |
| Carrier T4 | 185 | 0.43 | 5.8 | 157 |
| Carrier T5 | 186 | 0.42 | 5.5 | 162 |
| Carrier T6 | 190 | 0.43 | 5.6 | 160 |
| Carrier T7 | 180 | 0.44 | 5.7 | 158 |
| Carrier T8 | 158 | 0.23 | 8.6 | 108 |
| Carrier T9 | 162 | 0.28 | 7.9 | 125 |

2. Testing the Activities of the Sulfur-Tolerant Carbon Monoxide Shift Conversion Catalysts F1-F9

The conditions for measuring the activities of the sulfur-tolerant carbon monoxide shift conversion catalyst are as follows: a reaction pressure of 4 Mpa, a gas space velocity of 3000 h$^{-1}$, a reaction temperature of 250-400° C., a molar ratio of steam to gas at 1.0, and the composition of the raw material gas in mass percentage is: 46 wt % of CO; 5 wt % of $CO_2$; 1 wt % of $H_2S$, the balance being $H_2$. The activity of the catalyst is expressed as the conversion rate of CO, with the results shown in Table 2:

TABLE 2

|  | 250□ Conversion rate of CO (%) | 300□ Conversion rate of CO (%) | 350□ Conversion rate of CO (%) | 400□ Conversion rate of CO (%) |
|---|---|---|---|---|
| Catalyst F1 | 86.2 | 92.6 | 93.8 | 85.6 |
| Catalyst F2 | 81.5 | 86.5 | 89.3 | 81.6 |
| Catalyst F3 | 83.3 | 90.2 | 91.1 | 83.3 |
| Catalyst F4 | 78.0 | 84.9 | 87.9 | 80.2 |
| Catalyst F5 | 78.2 | 85.5 | 88.4 | 80.8 |
| Catalyst F6 | 85.0 | 90.2 | 89.7 | 84.4 |
| Catalyst F7 | 81.7 | 87.3 | 88.1 | 79.8 |
| Catalyst F8 | 63.1 | 75.0 | 79.3 | 74.6 |
| Catalyst F9 | 65.3 | 76.2 | 80.7 | 76.5 |

3. TEM Image of the Sulfur-Tolerant Carbon Monoxide Shift Conversion Catalyst in Example 1

The CoO and $MoO_3$ constitute the active component of the catalyst, and the main phase of the active component is $MoS_2$, as shown in FIG. 1, the $MoS_2$ phase has a size of about 5 nm. The lattice fringes bent significantly, the lattice spacing is 0.62 nm which is largely consistent with the interplanar spacing (002) of $MoS_2$, indicating that the sheet-like $MoS_2$ grows with its (002) plane perpendicular to the carrier. In general, the coordinatively unsaturated position at the sheet-edge of the $MoS_2$ is the active site of the catalyst, so more active sites can be exposed when the sheet-like active phase grows perpendicularly to the surface of the carrier, thus greatly improving the utilization and performance of the active component of the catalyst.

As can be seen from the above results, the catalyst carriers prepared by the present invention have high strength, high specific surface area, large pore volume, and small pore diameter. The relatively high mechanical strength give the catalyst carriers a good stability. The active phase of the catalyst has a nano-structure, and can expose more active sites. The sulfur-tolerant carbon monoxide shift catalysts provided in the present invention have a higher catalytic activity when compared with that of the Comparative Examples at 250° C., 300° C., 350° C., and 400° C., and shows the optimal activity at 350° C.

Obviously, the above examples are merely illustrations clearly made, and not limited to the embodiments. For those skilled in the art, based on the above description, changes or alterations may be made in other different forms. All embodiments do not need to or cannot be exhaustive hereof. Obvious changes or alterations that is introduced thereof is still within the scope of the invention.

The invention claimed is:

1. A sulfur tolerant CO shift conversion catalyst, at least prepared by the following materials:
   a magnesium source, 8.9-18.5 parts by weight;
   an aluminum source, a molar ratio of the magnesium source to the aluminum source is 0.92-1.36 wherein the magnesium source is calculated in the form of MgO and the aluminum source is calculated in the form of $Al_2O_3$;
   an oxide flux, 1.5-3.0 parts by weight;
   a magnesia-alumina spinel powder as a crystal growth agent, 1.5-3.6 parts by weight;
   a rare earth additive, 0.9-3.0 parts by weight;
   CoO, 0.2-1.5 parts by weight;
   $MoO_3$, 1.4-3.2 parts by weight; and
   an acidic aqueous solution, 37.8-63.3 parts by weight.

2. The catalyst of claim 1, wherein, the oxide flux is one or a mixture of two selected from the group consisting of CaO, $K_2O$, PbO and $B_2O_3$, and has a particle size of 150-200 mesh.

3. The catalyst of claim 2, wherein, the rare earth additive is selected from the group consisting of $La_2O_3$, $Pr_2O_3$, $CeO_2$ and mixtures thereof.

4. The catalyst of claim 3, wherein, the acidic aqueous solution is selected from the group consisting of nitric acid, oxalic acid, citric acid, acetic acid or mixtures thereof, and has a concentration of 0.5~6 mol/L.

5. The catalyst of claim 4, wherein, the CoO and $MoO_3$ constitute an active component of the catalyst, and a main phase of the active component is $MoS_2$ having a sheet structure with a size of 5 nm.

6. The catalyst of claim 3, wherein, the aluminum source is selected from the group consisting of pseudo-boehmite powder, $Al_2O_3$, $Al_2O_3.H_2O$, $Al_2O_3$ $3H_2O$, aluminium nitrate and mixtures thereof.

7. The catalyst of claim 6, wherein, the magnesium source is selected from the group consisting of basic magnesium carbonate, $Mg(OH)_2$, light MgO and mixtures thereof.

8. The catalyst of claim 1, wherein, the magnesia-alumina spinel powder has a particle size of 150-200 mesh and a specific surface area of 20-40 m$^2$/g.

9. The catalyst of claim 8, wherein, the oxide flux is one or a mixture of two selected from the group consisting of CaO, $K_2O$, PbO and $B_2O_3$, and has a particle size of 150-200 mesh.

10. The catalyst of claim 9, wherein, the rare earth additive is selected from the group consisting of $La_2O_3$, $Pr_2O_3$, $CeO_2$ and mixtures thereof.

11. The catalyst of claim 10, wherein, the magnesium source is selected from the group consisting of basic magnesium carbonate, $Mg(OH)_2$, light MgO and mixtures thereof.

12. The catalyst of claim 11, wherein, the acidic aqueous solution is selected from the group consisting of nitric acid, oxalic acid, citric acid, acetic acid or mixtures thereof, and has a concentration of 0.5~6 mol/L.

13. The catalyst of claim 12, wherein, the CoO and $MoO_3$ constitute an active component of the catalyst, and a main phase of the active component is $MoS_2$ having a sheet structure with a size of 5 nm.

14. The catalyst of claim 10, wherein, the acidic aqueous solution is selected from the group consisting of nitric acid, oxalic acid, citric acid, acetic acid or mixtures thereof, and has a concentration of 0.5~6 mol/L.

15. The catalyst of claim 14, wherein, the CoO and $MoO_3$ constitute an active component of the catalyst, and a main phase of the active component is $MoS_2$ having a sheet structure with a size of 5 nm.

16. The catalyst of claim 10, wherein, the aluminum source is selected from the group consisting of pseudo-boehmite powder, $Al_2O_3$, $Al_2O_3.H_2O$, $Al_2O_3.3H_2O$, aluminium nitrate and mixtures thereof.

17. The catalyst of claim 16, wherein, the acidic aqueous solution is selected from the group consisting of nitric acid, oxalic acid, citric acid, acetic acid or mixtures thereof, and has a concentration of 0.5~6 mol/L.

18. The catalyst of claim 17, wherein, the CoO and $MoO_3$ constitute an active component of the catalyst, and a main phase of the active component is $MoS_2$ having a sheet structure with a size of 5 nm.

\* \* \* \* \*